(12) United States Patent
Tsukamoto et al.

(10) Patent No.: US 10,087,796 B2
(45) Date of Patent: Oct. 2, 2018

(54) LUBRICATING STRUCTURE OF INTERNAL COMBUSTION ENGINE AND MOTORCYCLE

(71) Applicant: SUZUKI MOTOR CORPORATION, Hamamatsu-shi, Shizuoka (JP)

(72) Inventors: Kohei Tsukamoto, Hamamatsu (JP); Yosuke Katsuya, Hamamatsu (JP); Shintaro Yagi, Hamamatsu (JP)

(73) Assignee: SUZUKI MOTOR CORPORATION, Hamamatsu-Shi (JP)

( * ) Notice: Subject to any disclaimer, the term of this patent is extended or adjusted under 35 U.S.C. 154(b) by 146 days.

(21) Appl. No.: 15/335,103

(22) Filed: Oct. 26, 2016

(65) Prior Publication Data

US 2017/0114686 A1   Apr. 27, 2017

(30) Foreign Application Priority Data

Oct. 27, 2015  (JP) .................................. 2015-210364
Oct. 27, 2015  (JP) .................................. 2015-210365

(51) Int. Cl.

| F01M 11/02 | (2006.01) |
| F01M 1/04 | (2006.01) |
| F01M 1/02 | (2006.01) |
| F01M 1/06 | (2006.01) |
| F16F 15/26 | (2006.01) |

(52) U.S. Cl.
CPC .............. *F01M 11/02* (2013.01); *F01M 1/02* (2013.01); *F01M 1/06* (2013.01); *F01M 2011/028* (2013.01); *F16F 15/264* (2013.01)

(58) Field of Classification Search
CPC .... F01M 11/02; F01M 1/02; F01M 2011/028; F01M 1/06; F16F 15/264; F16F 15/265; F16F 15/267; F16F 15/268; F16F 15/26; F16F 15/20; F16F 15/22; F16F 2232/02
USPC ........................................ 123/196 R, 196 CP
See application file for complete search history.

(56) References Cited

U.S. PATENT DOCUMENTS

| 5,884,599 | A | * | 3/1999 | Shiozaki | ................ F02B 61/02 |
| | | | | | 123/192.2 |
| 6,263,853 | B1 | * | 7/2001 | Rau | ...................... F02F 7/0007 |
| | | | | | 123/192.2 |
| 2007/0272194 | A1 | * | 11/2007 | Hoi | ....................... B63B 35/731 |
| | | | | | 123/196 R |
| 2011/0067666 | A1 | * | 3/2011 | Hashimoto | .............. F01M 1/02 |
| | | | | | 123/192.2 |

(Continued)

FOREIGN PATENT DOCUMENTS

| JP | 4-107543 U | 9/1992 |
| JP | 10-54296 A | 2/1998 |

*Primary Examiner* — Syed O Hasan
(74) *Attorney, Agent, or Firm* — Stein IP, LLC (57) ABSTRACT

An aspect of the invention is directed to a lubricating structure of an internal combustion engine for feeding oil from an oil pump to respective portions of the internal combustion engine where a balancer shaft is disposed in parallel with a crankshaft in a crankcase, wherein: a main gallery and an oil passage are provided in the crankcase so that oil can be delivered from the oil pump to the main gallery and the oil of the main gallery can be guided by the oil passage to pass through a bearing of the balancer shaft; and the oil passage feeds the oil that has passed through the bearing of the balancer shaft to a cylinder head.

15 Claims, 8 Drawing Sheets

(56) References Cited

U.S. PATENT DOCUMENTS

2015/0159525 A1* 6/2015 Matsuda ................ F02B 39/12
123/196 A

* cited by examiner

LUBRICATING STRUCTURE OF INTERNAL COMBUSTION ENGINE AND MOTORCYCLE

CROSS-REFERENCE TO RELATED APPLICATIONS

This application claims the benefit of Japanese Patent Application JP 2015-210364, filed Oct. 27, 2015, and Japanese Patent Application JP 2015-210365, filed Oct. 27, 2015, the entire contents of which are hereby incorporated by reference, the same as if set forth at length.

FIELD OF THE INVENTION

The present invention relates to a lubricating structure of an internal combustion engine for feeding oil to respective portions of the internal combustion engine, and a motorcycle.

BACKGROUND OF THE INVENTION

In a lubricating structure of an internal combustion engine, generally, oil is pumped up from an oil pan by an oil pump, and fed to respective portions of the internal combustion engine through oil passages diverging from a main gallery. As this type of lubricating structure of the internal combustion engine, there has been known a lubricating structure of an internal combustion engine in which oil is directly fed from a main gallery to a bearing of a shaft requiring high oil pressure (e.g. see JP-UM-A-4-107543). The internal combustion engine according to JP-UM-A-4-107543 uses a two-shaft balancer structure in which balancer shafts are disposed on front and rear sides of a crankshaft. Oil passages extending toward bearings of the front and rear balancer shafts or bearings of various transmission shafts diverge from the main gallery which is high in oil pressure. As this type of lubricating structure of the internal combustion engine, there has been known a lubricating structure of an internal combustion engine in which oil having lubricated a valve device such as a camshaft inside a cylinder head is returned to an oil pan through a cam chain chamber where a cam chain is received (e.g. see JP-A-10-054296). In the internal combustion engine according to JP-A-10-054296, a valve chamber in which the valve device is received and the cam chain chamber are made to communicate with each other, and the oil which has lubricated the valve chamber flows down into the cam chain chamber to be returned to the oil pan.

SUMMARY OF THE INVENTION

In the lubricating structure of the internal combustion engine according to JP-UM-A-4-107543, the oil passages extending toward the bearings of the respective shafts diverge from the main gallery individually. Accordingly, oil with high oil pressure is fed to the bearings of the respective shafts. However, the oil with high oil pressure which has lubricated the bearings of the respective shafts is returned directly to the oil pan. For this reason, the oil with high oil pressure is not effectively used. In addition, the oil passages are formed disorderly except some of the passages. Accordingly, there is a possibility that the weight and the man-hours of machining may be increased due to arrangement of new pipes, and further, the oil pressure may be slightly lowered in accordance with an increase in the length of each oil passage.

A first aspect of the invention has been accomplished in consideration of such a point. An object of the first aspect of the invention is to provide a lubricating structure of an internal combustion engine in which oil passages can be shortened without increasing the weight and the man-hours of machining, and further, oil with high oil pressure from a main gallery can be used effectively, and to provide a motorcycle.

The lubricating structure of the internal combustion engine according to the first aspect of the invention is a lubricating structure of an internal combustion engine for feeding oil from an oil pump to respective portions of the internal combustion engine where a balancer shaft is disposed in parallel with a crankshaft in a crankcase, wherein: a main gallery and an oil passage are formed in the crankcase so that oil can be delivered from the oil pump to the main gallery and the oil of the main gallery can be guided by the oil passage to pass through a bearing of the balancer shaft; and the oil passage feeds the oil that has passed through the bearing of the balancer shaft to a cylinder head.

According to this configuration, oil with high oil pressure is delivered from the oil pump to the main gallery. The oil with high oil pressure is fed from the main gallery to the bearing of the balancer shaft through the oil passage. Accordingly, the balancer shaft is rotatably supported on the bearing by an oil film of the oil so that the balancer shaft can be prevented from seizing. In addition, since the oil pressure of the oil which has been delivered to the cylinder head through the bearing of the balancer shaft is high, the oil can be reused for lubricating respective portions inside the cylinder head. In addition, oil can be fed from the main gallery to the bearing of the balancer shaft and the cylinder head through the oil passage shared by the bearing of the balancer shaft and the cylinder head. Accordingly, it is unnecessary to form independent oil passages in the crankcase. Accordingly, arrangement of individual pipes can be dispensed with, the weight and the man-hours of machining can be prevented from being increased, and the oil passage can be further shortened.

In the lubricating structure of the internal combustion engine according to the first aspect of the invention, the oil passage is formed in the crankcase so as to pass through an axial end of the balancer shaft. According to this configuration, oil can be fed from the oil passage passing through the axial end of the balancer shaft toward an axial end of a camshaft inside the cylinder head.

In the lubricating structure of the internal combustion engine according to the first aspect of the invention, the crankcase includes an upper case and a lower case which are divided from each other vertically, and the bearing of the balancer shaft is disposed in a mating face between the upper face and the lower face. According to this configuration, oil is returned into the crankcase even when the oil leaks in a position where the bearing is mounted. Accordingly, a sealing material for preventing leakage of the oil can be dispensed with so that the number of components can be reduced.

In the lubricating structure of the internal combustion engine according to the first aspect of the invention, a lubricating route from the main gallery toward the cylinder head and a lubricating route from the main gallery toward a bearing of the crankshaft are different from each other. According to the configuration, lowering of the oil pressure in the cylinder head can be suppressed from affecting the oil pressure on the bearing of the crankshaft.

In the lubricating structure of the internal combustion engine according to the first aspect of the invention, a sub gallery for feeding the oil of the main gallery to the respective portions of the internal combustion engine is formed in the crankcase, and the oil passage is formed at one of opposite left and right sides of the crankcase while another oil passage for feeding the oil of the main gallery to the sub gallery is formed at the other side of the crankcase. According to this configuration, the oil pressure of the main gallery can be divided into equal halves on the left and right sides. In addition, since the oil passages are distant from each other on the left and right sides, lowering of the oil pressure in the cylinder head can be prevented from affecting the oil pressure on the sub gallery.

In the lubricating structure of the internal combustion engine according to the first aspect of the invention, an oil return passage for returning the oil from the cylinder head to a lower portion of the internal combustion engine is formed between the oil passage and the other oil passage in the left/right direction of the crankcase. According to this configuration, the width of the crankcase in the left/right direction can be reduced.

In the lubricating structure of the internal combustion engine according to the first aspect of the invention, the balancer shaft serves as a front balancer shaft disposed in front of the crankshaft, a lower balancer shaft is disposed below the crankshaft, and the main gallery is formed in front of the lower balancer shaft in the crankcase. According to this configuration, the width of the crankcase in the front/rear direction can be reduced, in comparison with a configuration in which the balancer shafts are disposed on the front and rear sides of the crankshaft in the crankcase. In addition, arrangement of the lower balancer shaft can be also prevented from interfering with the main gallery.

A motorcycle according to the first aspect of the invention includes the aforementioned lubricating structure of the internal combustion engine. According to this configuration, oil with high oil pressure in the main gallery can be effectively used for the respective portions of the internal combustion engine of the motorcycle.

According to the lubricating structure of the internal combustion engine according to the first aspect of the invention, oil is fed from the main gallery to the cylinder head through the bearing of the balancer shaft. Accordingly, the oil with high oil pressure can be reused for lubricating the respective portions of the cylinder head. In addition, oil is fed from the main gallery to the bearing of the balancer shaft and the cylinder head through the oil passage shared by the bearing of the balancer shaft and the cylinder head. Accordingly, arrangement of individual pipes can be dispensed with so that the oil passage can be further shortened.

In the lubricating structure of the internal combustion engine according to JP-A-10-054296, oil flows down into the cam chain camber. Accordingly, the oil makes contact with the cam chain circulated inside the cam chain chamber. Thus, oil mist is generated so that a large part of the oil mist is mixed into blowby gas. In addition, due to the oil making contact with the cam chain, return of the oil into the oil pan is delayed.

A second aspect of the invention has been accomplished in consideration of such a point. An object of the second aspect of the invention is to provide a lubricating structure of an internal combustion engine in which oil can be quickly returned from a cylinder head into a crankcase without increasing oil mist, and to provide a motorcycle.

The lubricating structure of the internal combustion engine according to the second aspect of the invention is a lubricating structure of an internal combustion engine for feeding oil to a cylinder head from a crankcase in which a balancer shaft is disposed in parallel with a crankshaft, wherein: an oil passage for feeding oil to the cylinder head and an oil return passage for returning the oil from the cylinder head into the crankcase are formed in the crankcase; and an outlet of the oil return passage is connected to a balancer chamber on a front side of the crankcase relatively to the balancer shaft which is received in the balancer chamber inside the crankcase.

According to this configuration, oil which has entered the oil return passage from the cylinder head flows down from the outlet of the oil return passage to the front side of the balancer chamber relatively to the balancer shaft inside the crankcase. Since the outlet of the oil return passage is distant from the balancer shaft, the oil can be prevented from making contact with the balancer shaft. Accordingly, generation of oil moist inside the crankcase can be reduced so that mixture of the oil mist into blowby gas can be reduced. In addition, since oil from the oil return passage does not make contact with the balancer shaft, the oil can be returned from the cylinder head into the crankcase quickly.

In the lubricating structure of the internal combustion engine according to the second aspect of the invention, the outlet of the oil return passage is connected to a front side of the balancer chamber and on one end side of the crankcase in a left/right direction. According to this configuration, oil from the oil return passage can be made farthest from the balancer shaft so that the oil can be further prevented from easily making contact with the balancer shaft.

In the lubricating structure of the internal combustion engine according to the second aspect of the invention, the oil return passage has an inclined passage that is inclined toward the front of the crankcase so that the inclined passage becomes vertical when the crankcase is mounted in a vehicle. According to this configuration, the inclined passage faces the vertical direction when the crankcase is mounted in the vehicle. Accordingly, oil can be returned from the cylinder head to the crankcase quickly.

In the lubricating structure of the internal combustion engine according to the second aspect of the invention, a cam chain chamber where a cam chain is received inside the crankcase is formed at one of opposite left and right sides of the crankcase, and the oil return passage is formed at the other side of the crankcase. According to this configuration, the cam chain chamber is formed on the opposite side to the oil return passage in the left/right direction of the crankcase. Accordingly, a flow amount of oil into the cam chain chamber can be reduced. In addition, oil can be efficiently returned from the opposite left and right sides of the cylinder head into the crankcase by the oil return passage and the cam chain chamber. Accordingly, accumulation of the oil in the cylinder head can be solved.

In the lubricating structure of the internal combustion engine according to the second aspect of the invention, the oil passage is formed at one of opposite left and right sides of the crankcase and the oil return passage is formed at the other side of the crankcase. According to this configuration, a lubricating route for feeding oil from one of the opposite left and right sides of the cylinder head to the camshaft and returning the oil from the other side of the cylinder head to the crankcase can be formed.

In the lubricating structure of the internal combustion engine according to the second aspect of the invention, the oil passage feeds the oil that has passed through a bearing of the balancer shaft to the cylinder head. According to this configuration, oil with high oil pressure is fed from the main gallery to the bearing of the balancer shaft through the oil passage. In addition, since the oil pressure of the oil which has been delivered to the cylinder head through the bearing of the balancer shaft is high, the oil can be reused for lubricating respective portions of the cylinder head. In addition, since oil is fed from the main gallery to the bearing of the balancer shaft and the cylinder head through the oil passage shared by the bearing of the balancer shaft and the cylinder head, it is unnecessary to form independent oil passages in the crankcase.

In the lubricating structure of the internal combustion engine according to the second aspect of the invention, a main gallery and a sub gallery are formed in the crankcase so that oil can be fed from the main gallery to a bearing of the balancer shaft and the oil that has passed through the bearing of the balancer shaft can be fed to the respective portions of the internal combustion engine through the sub gallery located above the balancer chamber; and the oil return passage passes through the front side of the crankcase relatively to the sub gallery. According to this configuration, the oil return passage is formed in a dead space of a front wall of the crankcase where the balancer shaft is formed. Accordingly, the weight of the crankcase can be further reduced.

In the lubricating structure of the internal combustion engine according to the second aspect of the invention, the balancer shaft serves as a front balancer shaft disposed in front of the crankshaft, a lower balancer shaft is disposed below the crankshaft, and the main gallery is formed in front of the lower balancer shaft in the crankcase. According to this configuration, the width of the crankcase in the front/rear direction can be reduced, in comparison with a configuration in which the balancer shafts are disposed on the front and rear sides of the crankshaft in the crankcase. In addition, arrangement of the lower balancer shaft can be also prevented from interfering with the main gallery.

A motorcycle according to the second aspect of the invention includes the aforementioned lubricating structure of the internal combustion engine. According to this configuration, oil can be returned from the cylinder head into the crankcase of the motorcycle quickly.

According to the lubricating structure of the internal combustion engine according to the second aspect of the invention, the outlet of the oil return passage for returning oil from the cylinder head is connected to the front side of the balancer chamber relatively to the balancer shaft. Accordingly, contact between the oil and the balancer shaft can be suppressed. Thus, generation of oil mist can be reduced, and the oil can be returned from the cylinder head into the crankcase quickly.

REFERENCE SIGNS LIST 1 internal combustion engine
10 cylinder
12 cylinder head
21 crankcase
27 upper case
28 lower case
34 mating face between upper case and lower case
41 crankshaft
51 front balancer shaft (balancer shaft)
54 lower balancer shaft
61 oil pump
62 main gallery
72a, 75a oil passage (another oil passage)
72c, 75 coil passage
73 bearing of front balancer shaft
76 sub gallery
85 oil return passage
102 bearing of crankshaft
86 front balancer chamber (balancer chamber)
87 outlet of oil return passage
92 inclined passage
93 cam chain chamber

DETAILED DESCRIPTION OF THE INVENTION

Figure 1:
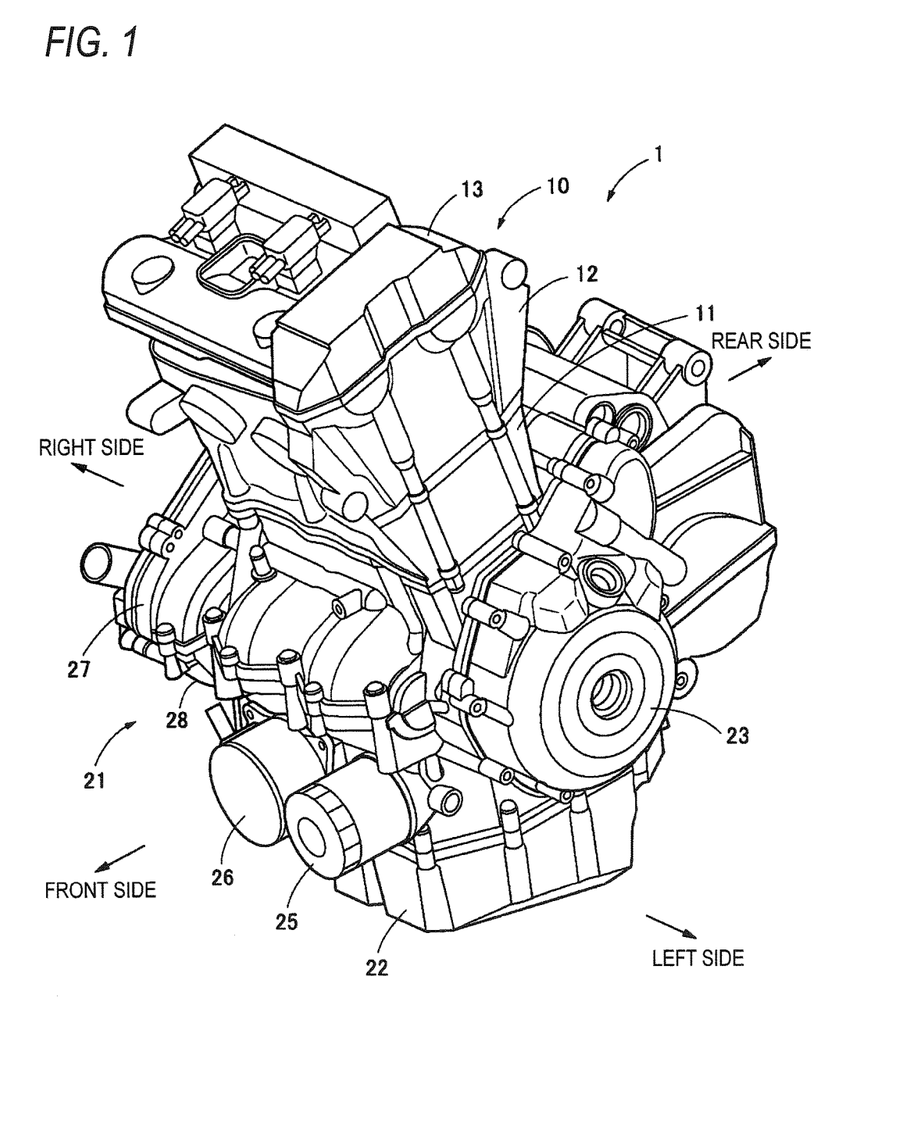
FIG. 1 is a perspective view of an internal combustion engine according to an embodiment of the invention.
Figure 2:
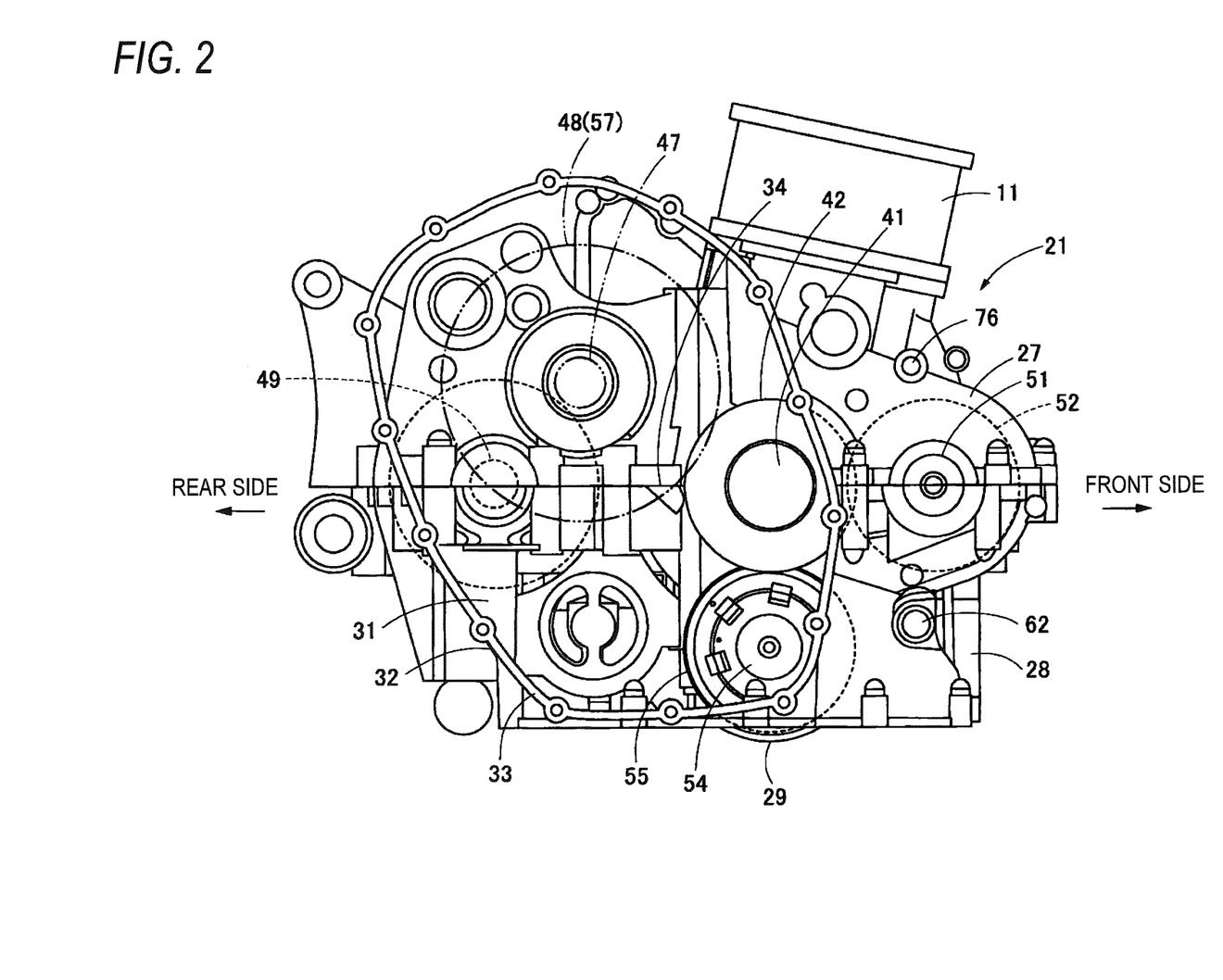
FIG. 2 is a right side view of a crankcase according to the embodiment.
Figure 3:
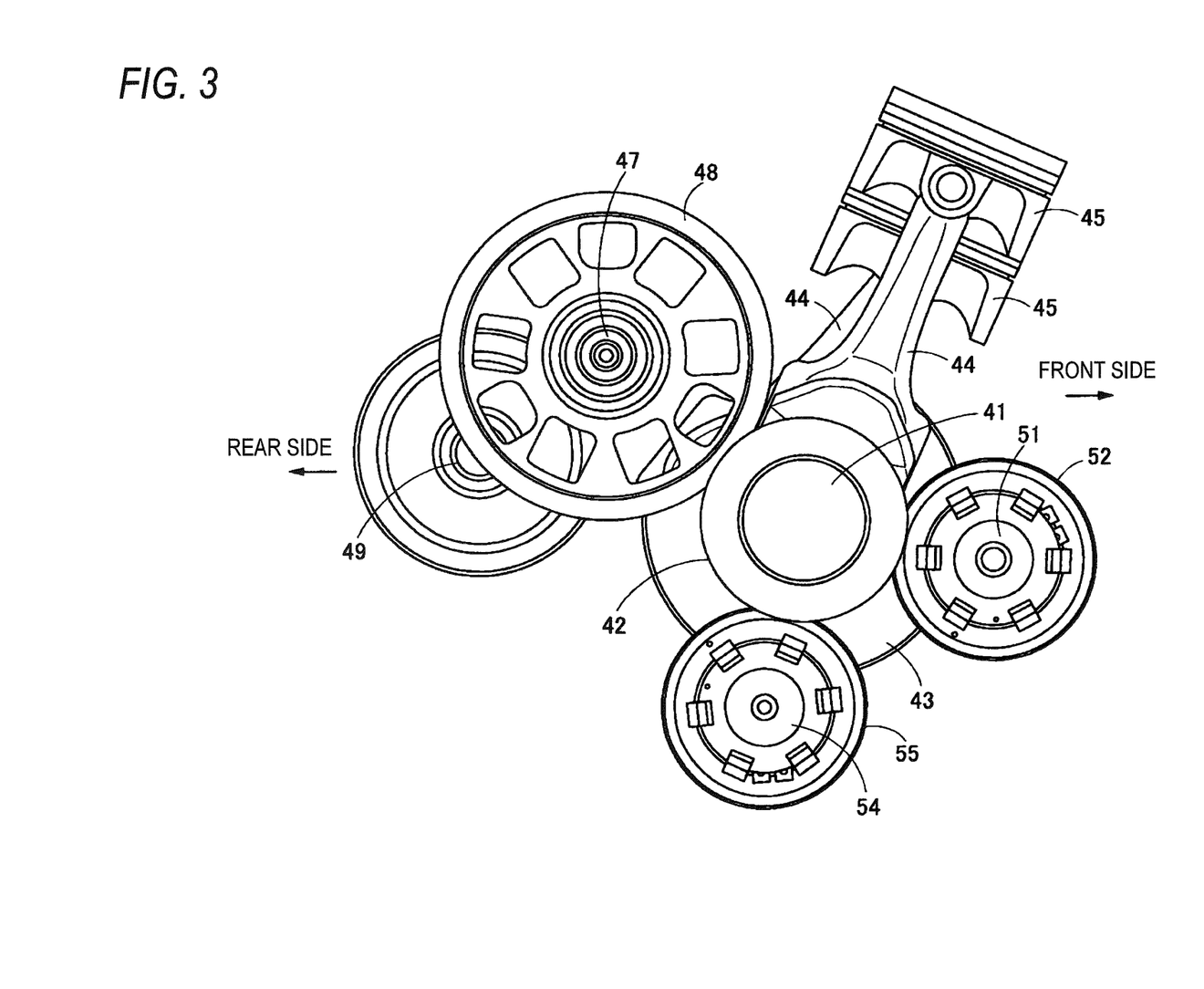
FIG. 3 is a side view showing the layout of shafts according to the embodiment.

An embodiment of the invention will be described below in detail with reference to the accompanying drawings. Incidentally, an example in which a lubricating structure of an internal combustion engine is applied to a motorcycle will be described below. The lubricating structure of the internal combustion engine is however not limited to the motorcycle but may be also applied to another vehicle such as a four-wheeled vehicle. FIG. 1 is a perspective view of the internal combustion engine according to the embodiment. FIG. 2 is a right side view of a crankcase according to the embodiment. FIG. 3 is a side view showing the layout of shafts according to the embodiment. Incidentally, for convenience of explanation, a countershaft and a clutch are designated by a two-dot chain line, and a front balancer shaft and a driveshaft in the crankcase are designated by a broken line in FIG. 2.

As shown in FIG. 1, an internal combustion engine 1 is a parallel two-cylinder engine which has a configuration in which a cylinder 10 is disposed on a crankcase 21. The cylinder 10 has a configuration in which a cylinder head 12 and a head cover 13 are attached to a cylinder block 11 disposed on the crankcase 21. An oil pan 22 in which oil for lubrication and cooling is stored is attached to a lower portion of the crankcase 21. A generator cover 23 for forming a generator chamber is attached to a left side portion of the crankcase 21. An oil filter 25 and an oil cooler 26 are attached to a front portion of the crankcase 21.

As shown in FIG. 2, the crankcase 21 has a vertically divided structure including an upper case 27 and a lower case 28. When a clutch cover (not shown) is removed, a right side space 31 of the crankcase 21 is opened to the outside. The right side space 31 of the crankcase 21 is a space which is partitioned from a crank chamber, a transmission chamber, etc. inside the crankcase by side walls of the upper case 27 and the lower case 28, and surrounded by a circumferential wall 32 protruding from the side walls of the upper case 27 and the lower case 28. A part of the right side space 31 of the crankcase 21 can be visually recognized from the outside through an opening portion in a mating face 33 with the clutch cover. The mating face 33 is formed in the circumferential wall 32.

Three main shafts, i.e. a crankshaft 41, a countershaft 47 and a driveshaft 49 are disposed in parallel with one another and triangularly on side walls (journal walls) of the crankcase 21. The crankshaft 41 is received in the crank chamber inside the crankcase and supported rotatably on a mating face 34 between the upper case 27 and the lower case 28. The countershaft 47 is received in the transmission chamber inside the crankcase, and supported rotatably on the side wall of the upper case 27 at the rear of the crankshaft 41. The driveshaft 49 is received in the transmission chamber inside the crankcase and supported rotatably on the mating face 34 between the upper case 27 and the lower case 28 at the rear of the countershaft 47.

A front balancer shaft 51 is disposed in front of the crankshaft 41. A lower balancer shaft 54 is disposed below the crankshaft 41. The front balancer shaft 51 is received in a front balancer chamber 86 (see FIG. 7B), and supported rotatably on the mating face 34 between the upper case 27 and the lower case 28. When a balancer housing 29 is attached to the lower case 28, the lower balancer shaft 54 is supported rotatably on a mating face 35 (see FIG. 6A) between the lower case 28 and the balancer housing 29. Due to the balancer housing 29 which is attached removably to the lower case 28, the lower balancer shaft 54 can be removed to thereby perform changeover between one-shaft balancer and two-shaft balancer.

A primary drive gear 42 of the crankshaft 41, a primary driven gear 48 of the countershaft 47, a front balancer driven gear 52 of the front balancer shaft 51, and a lower balancer driven gear 55 of the lower balancer shaft 54 are received in the right side space 31 of the crankcase 21. The primary driven gear 48, the front balancer driven gear 52 and the lower balancer driven gear 55 are engaged with the primary drive gear 42. When three kinds of gears are driven by a single gear in this manner, it is unnecessary to specially disengage the three kinds of gears in the crankshaft 41. Thus, the total length of the crankshaft 41 can be shortened.

In addition, the right side space 31 of the crankcase 21 is opened to the outside through the opening portion in the mating face 33 with the clutch cover, as described above. The primary drive gear 42 except a part thereof is exposed to the outside from the crankcase 21. A clutch 57 and the primary driven gear 48 are entirely exposed to the outside. In addition, the front balancer driven gear 52 is hidden inside the crankcase 21. The lower balancer driven gear 55 except a part thereof is exposed to the outside from the crankcase 21. When the gears are exposed to the outside from the right side space 31 in this manner, alignment (phase matching) among the gears can be made easily.

As shown in FIG. 3, the crankshaft 41 has a configuration in which crank webs 43 are connected through crank pins (not shown) and crank journals (not shown). Pistons 45 are connected to the crank pins through connecting rods 44. Reciprocating motion of the pistons 45 is converted into rotating motion of the crankshaft 41. Rotation of the crankshaft 41 is transmitted to the countershaft 47 through the primary drive gear 42 and the primary driven gear 48. Rotation of the countershaft 47 is transmitted to the driveshaft 49 at a predetermined transmission ratio corresponding to a combination of transmission gears (not shown).

In addition, the rotation of the crankshaft 41 is transmitted to the front balancer shaft 51 through the primary drive gear 42 and the front balancer driven gear 52, and transmitted to the lower balancer shaft 54 through the primary drive gear 42 and the lower balancer driven gear 55. Periodical vibration occurring in the crankshaft 41 can be cancelled by the front balancer shaft 51 and the lower balancer shaft 54. The connecting rods 44, the lower balancer shaft 54, the front balancer shaft 51 and the countershaft 47 are disposed on upper, lower, front and rear sides of the crankshaft 41, respectively. With this layout, an internal space of the crankcase 21 (see FIG. 2) can be used effectively.

In the crankcase 21 configured thus, the lower balancer shaft 54 is disposed below the crankshaft 41. Thus, the width of the crankcase 21 in a front/rear direction can be reduced and mass centralization can be further attained, in comparison with a configuration in which the same balancer shaft is disposed on a front or rear side of the crankcase 21. In addition, a main gallery 62 (see FIG. 2) is formed in front of the lower balancer shaft 54. In this manner, the arrangement of the lower balancer shaft 54 can be prevented from interfering with the main gallery 62. In this case, the configuration is different from a configuration in which the main gallery is disposed right under the crankshaft as in a normal crankcase. Therefore, it is necessary to change lubricating routes for the respective portions of the internal combustion engine 1.

Particularly, the lubricating routes of the crankcase 21 have to be specialized for a two-shaft balancer structure in which the balancer shafts 52 and 54 can be disposed in front of and below the crankshaft 41 respectively. In the configuration according to the embodiment, oil which has passed through a bearing 73c (see FIG. 7A) of the front balancer shaft 51 from the main gallery 62 is fed to the cylinder head 12. Oil pressure of the oil having passed through the front balancer shaft 51 is kept sufficiently high. Therefore, the oil can be reused for lubricating respective portions of the cylinder head 12. In addition, in the embodiment, an oil return passage 85 is formed so that the oil which has been fed from the main gallery 62 to the cylinder head 12 and has lubricated the respective portions of the cylinder head 12 can be returned from the cylinder head 12 into the crankcase 21 through the oil return passage 85 (see FIG. 7B). An outlet 87 of the oil return passage 85 for returning oil from the cylinder head 12 is connected on a front side of the front balancer chamber 86 relatively to the front balancer shaft 51 so that contact between the oil and the front balancer shaft 51 can be suppressed.

Figure 4:
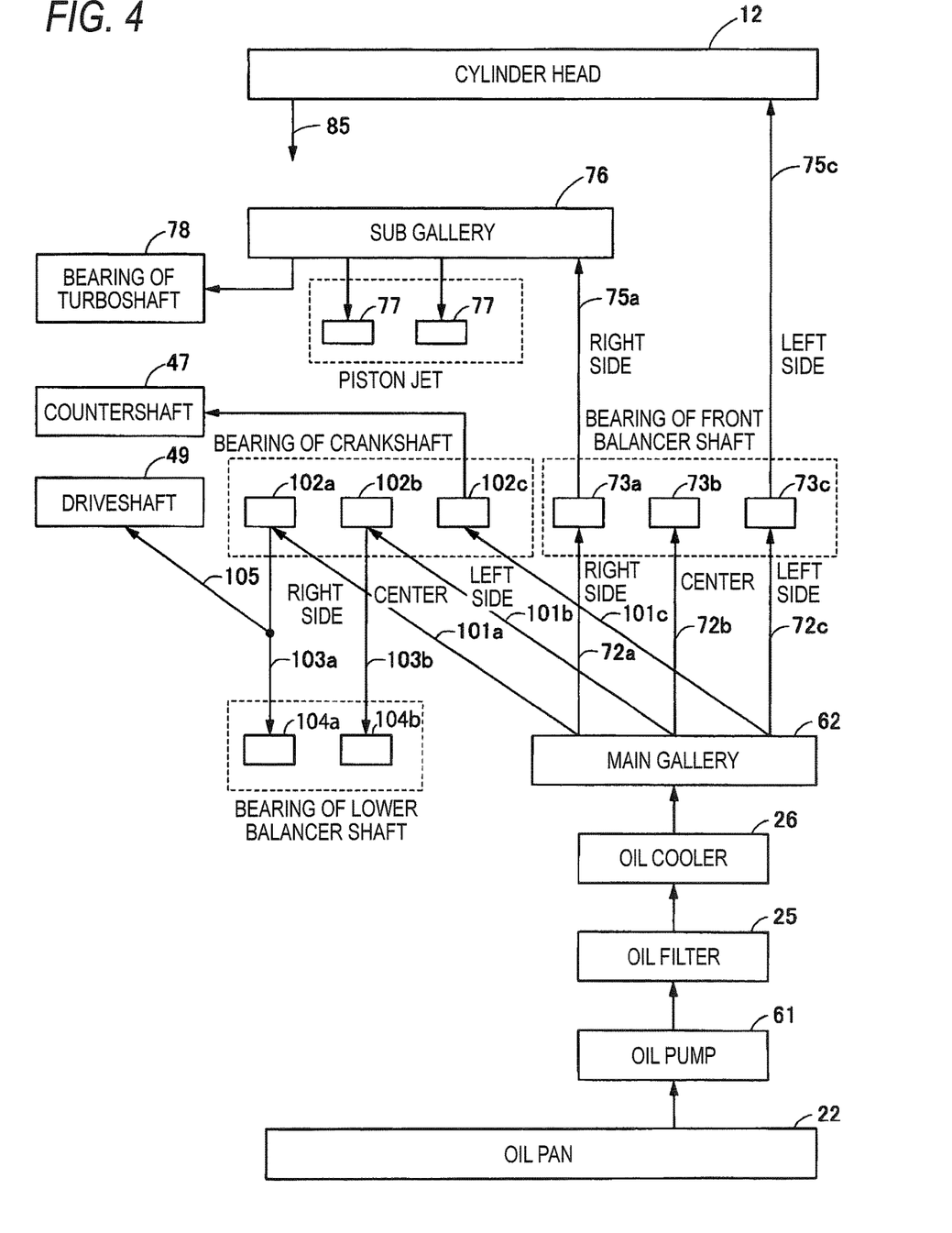
FIG. 4 is a block diagram showing lubricating routes of the internal combustion engine according to the embodiment.

The lubricating routes of the internal combustion engine formed inside the crankcase will be described below with reference to FIG. 4. FIG. 4 is a block diagram showing the lubricating routes of the internal combustion engine according to the embodiment.

As shown in FIG. 4, oil is stored in the oil pan 22 in the lower portion of the crankcase 21 (see FIG. 1). The oil in the oil pan 22 is sucked through a strainer by an oil pump 61 driven by the countershaft 47. The oil sucked through the strainer is delivered to the oil filter 25 by the oil pump 61. In addition, the oil in the oil filter 25 is delivered to the oil cooler 26 by the oil pump 61, and then delivered to the main gallery 62. On this occasion, fine foreign matter in the oil is filtered out by the oil filter 25 and the oil is cooled by the oil cooler 26.

Figure 5:
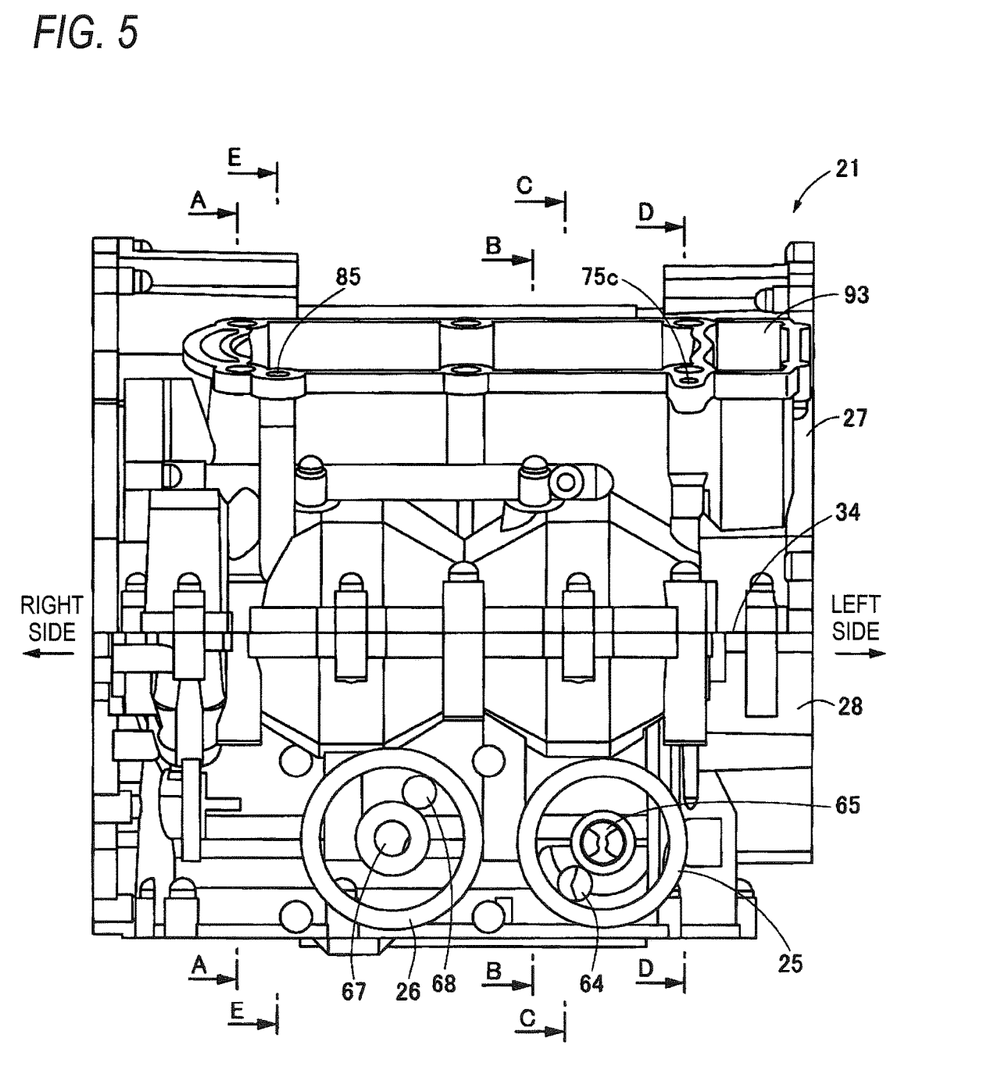
FIG. 5 is a front view of the crankcase according to the embodiment.

The oil filter 25 and the oil cooler 26 are disposed on a front face of the crankcase 21 (see FIG. 5). An inlet 64 communicating with the oil pump 61 and an outlet 65 communicating with the oil cooler 26 are formed in a mounting face for the oil filter 25 (see FIG. 5). The inlet 64 of the oil filter 25 is formed on a lower side than the center.

The outlet 65 of the oil filter 25 is formed in the center. An inlet 67 communicating with the oil filter 25, and an outlet 68 communicating with the main gallery 62 are formed in a mounting face for the oil cooler 26 (see FIG. 5). The inlet 67 of the oil cooler 26 is formed in the center. The outlet 68 of the oil cooler 26 is formed on an upper side than the center.

The oil in the main gallery 62 is fed to bearings 73a to 73c of the front balancer shaft 51 through oil passages 72a to 72c inside right, center and left journal walls 71a to 71c (see FIG. 8) of the lower case 28, respectively. The oil of the right bearing 73a of the front balancer shaft 51 is fed to a sub gallery 76 through an oil passage 75a inside a right journal wall 74a (see FIG. 6A) of the upper case 27. The oil in the sub gallery 76 is fed to piston jets 77 so as to be used for cooling the pistons 45 (see FIG. 3). Further, the oil in the sub gallery 76 is fed to a bearing 78 of a turboshaft (not shown) of a supercharger.

In addition, the oil of the left bearing 73c of the front balancer shaft 51 is fed to the cylinder head 12 through an oil passage 75c inside a left journal wall 74c (see FIG. 7A) of the upper case 27. The oil inside the cylinder head 12 lubricates a contact portion between a cam and a tappet through the inside of a camshaft (not shown), and is then returned to the oil pan 22 through the oil return passage 85 or a cam chain chamber 93 (see FIG. 5), etc. formed in the upper case 27. Thus, a lubricating route from the main gallery 62 toward the sub gallery 76 and a lubricating route from the main gallery 62 toward the cylinder head 12 are formed separately in the crankcase 21.

In addition, the oil in the main gallery 62 is fed to bearings 102a to 102c of the crankshaft 41 through oil passages 101a to 101c inside the right, center and left journal walls 71a to 71c (see FIG. 8) of the lower case 28, respectively. The oil of the right bearing 102a and the oil of the center bearing 102b in the crankshaft 41 are fed to bearings 104a and 104b of the lower balancer shaft 54 through oil passages 103a and 103b inside the journal walls 71a and 71b, respectively. The right oil passage 103a branches off in the midway thereof to feed the oil to the driveshaft 49 through an oil passage 105. The oil of the left bearing 102c of the crankshaft 41 is fed to the countershaft 47 through an oil groove on the journal wall 71c.

Thus, lubricating routes from the main gallery 62 toward the bearings 73a to 73c of the front balancer shaft 51 and lubricating routes from the main gallery 62 toward bearings 102a to 102c of the crankshaft 41 are formed separately in the crankcase 21. In addition, oil is fed to the sub gallery 76 and the cylinder head 12 through the lubricating routes of the bearings 73a and 73c of the front balancer shaft 51. In addition, the oil is fed to the respective bearings 104a and 104b of the lower balancer shaft 54, the countershaft 47 and the driveshaft 49 through the lubricating routes of the respective bearings 102a to 102c of the crankshaft 41.

Figure 6A:
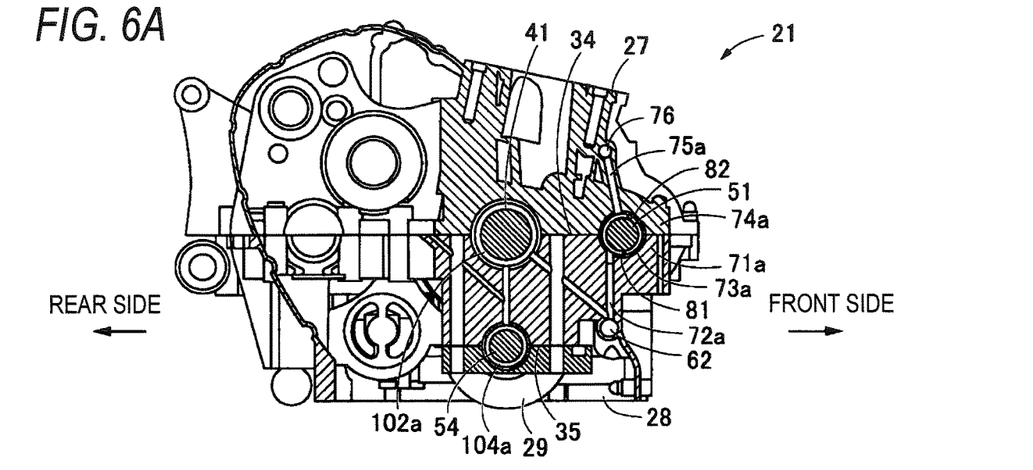
FIGS. 6A, 6B and 6C are sectional views of the crankcase according to the embodiment.
Figure 6B:
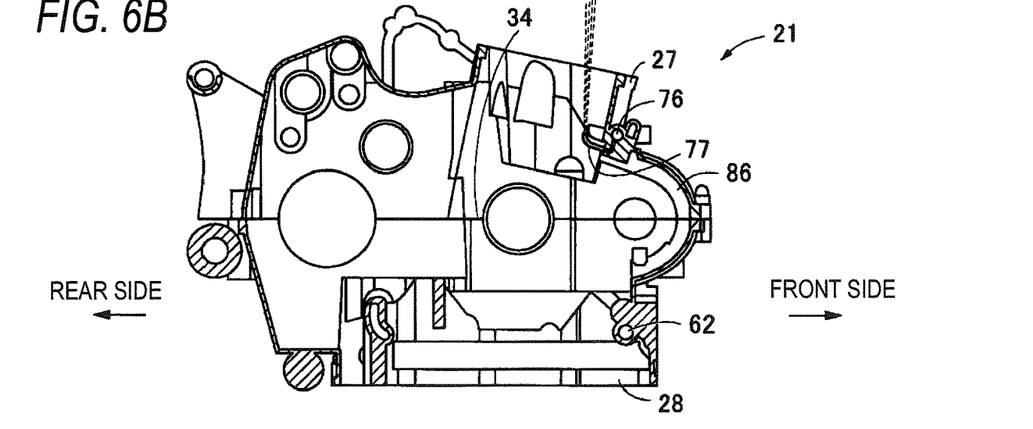
Figure 6C:
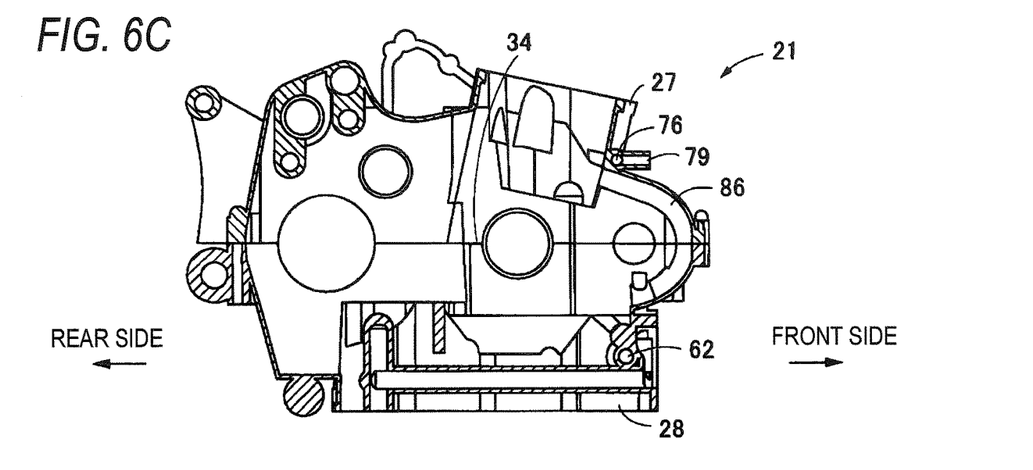

The lubricating structure of the internal combustion engine will be described below in detail. First, the lubricating routes for the balancer shaft will be described with reference to FIG. 5 and FIGS. 6A, 6B and 6C. FIG. 5 is a front view of the crankcase according to the embodiment. FIGS. 6A, 6B and 6C are sectional views of the crankcase according to the embodiment. FIG. 6A is a sectional view of FIG. 5 taken along a line A-A thereof. FIG. 6B is a sectional view of FIG. 5 taken along of a line B-B thereof. FIG. 6C is a sectional view of FIG. 5 taken along a line C-C thereof. Incidentally, FIG. 6A will be described with fastening bolts and the countershaft omitted for convenience of explanation. Moreover, FIGS. 6B and 6C will be described with various shafts omitted for convenience of explanation.

As shown in FIGS. 5 and 6A, the crankcase 21 includes the upper case 27 and the lower case 28 which are divided from each other vertically. The balancer housing 29 is attached to the lower case 28 below the crankshaft 41. Fastening bolts (not shown) shared by the upper case 27, the lower case 28, and the balancer housing 29 are inserted through the upper case 27, the lower case 28, and the balancer housing 29. The mating face 34 between the upper case 27 and the lower case 28 and the mating face 35 between the lower case 28 and the balancer housing 29 are fastened by the fastening bolts. The front balancer shaft 51, the crankshaft 41 and the driveshaft 49 (see FIG. 3) are supported on the mating face 34 between the upper case 27 and the lower case 28.

The countershaft 47 (see FIG. 3) is supported on the side face of the upper case 27. The lower balancer shaft 54 is supported on the mating face 35 between the lower case 28 and the balancer housing 29. That is, in the crankcase 21, the front balancer shaft 51 is disposed in front of the crankshaft 41, and the lower balancer shaft 54 is disposed below the crankshaft 41. In addition, the countershaft 47 and the driveshaft 49 are disposed at the rear of the crankshaft 41. The main gallery 62 for distributing oil delivered from the oil pump 61 (see FIG. 4) to the respective portions of the internal combustion engine 1 is formed in front of the lower balancer shaft 54 in the lower case 28 of the crankcase 21.

The main gallery 62 is formed on the obliquely lower front side of the crankshaft 41 in order to bypass the lower balancer shaft 54 positioned right below the crankshaft 41. The main gallery 62 is formed linearly in the lower case 28 in a left/right direction (perpendicular direction to the paper plane in FIG. 6A) and below the front balancer shaft 51. In the upper case 27, the sub gallery 76 for feeding oil to the respective portions of the internal combustion engine 1 is formed in the upper case 27 on the obliquely upper front side of the crankshaft 41. The sub gallery 76 is formed in parallel with the main gallery 62 and above the front balancer shaft 51. Thus, regions in which the main gallery 62 and the sub gallery 76 are formed in the crankcase 21 can be reduced so that the size of the crankcase 21 can be reduced.

In addition, the oil passages 72a and 75a are formed on the right side of the crankcase 21 so that oil of the main gallery 62 can be guided by oil passages 72a and 75a to pass through the bearing 73a of the front balancer shaft 51. The oil passage 72a extends from the main gallery 62 up to a bearing mounting face 81 for the front balancer shaft 51 on the lower case 28 side. The oil passage 75a extends up to the sub gallery 76 from a bearing mounting face 82 for the front balancer shaft 51 on the upper case 27 side. In addition, oil grooves 83 are formed in the bearing mounting faces 81 and 82 for the front balancer shaft 51 (see FIG. 8). The oil grooves 83 serve as oil passages for connecting the oil passages 72a and 75a to each other.

In addition, the upper case 27 and the lower case 28 are fastened firmly by the fastening bolts, as described above. The bearing 73a of the front balancer shaft 51 is mounted on the bearing mounting face 81 of the lower case 28 side and the bearing mounting face 82 of the upper case 27 side without any gap therebetween. In addition, the front balancer shaft 51 is received in the front balancer chamber 86 (see FIG. 6B). Accordingly, oil can be returned to the oil pan 22 (see FIG. 1) even when the oil leaks. In this manner, the oil passages pass through the position where the bearing 73a is mounted. Accordingly, differently from a case where the oil passages are formed in another position than the position where the bearing 73a is mounted, a sealing material such as an O-ring for preventing leakage of oil can be dispensed with so that the number of components can be reduced.

In addition, the front balancer shaft 51 is disposed on a straight line which connects the main gallery 62 and the sub gallery 76 in the crankcase 21. That is, the main gallery 62, the front balancer shaft 51, and the sub gallery 76 are arranged in a line in the named order from bottom to top. Accordingly, the oil passages 72a and 75a can be formed linearly so that the oil passages 72a and 75a can be shortened. As a result, the oil pressure can be suppressed from being lowered by the oil passages 72 and 75a. In addition, the oil passages 72a and 75a are formed by machining the upper case 27 and the lower case 28 once respectively. Accordingly, the man-hours of machining can be reduced.

Since oil with high oil pressure is delivered from the oil pump 61 (see FIG. 4) to the main gallery 62, the oil with high oil pressure can be fed from the main gallery 62 to the bearing 73a of the front balancer shaft 51. As a result, a sufficiently thick oil film can be formed on the bearing 73a of the front balancer shaft 51 which requires high oil pressure so that the front balancer shaft 51 can be prevented from seizing. On this occasion, sufficient oil pressure still remains in the oil even after the oil is fed to the bearing 73a of the front balancer shaft 51. In order to effectively use the oil pressure of the oil, the oil which has passed through the right bearing 73a of the front balancer shaft 51 is delivered to the sub gallery 76 while keeping the sufficient oil pressure.

As shown in FIG. 6B, the oil which has been delivered to the sub gallery 76 moves to the deeper side of the sub gallery 76 to be fed to the piston jets 77. When the oil is injected from the piston jets 77 toward the pistons 45 (see FIG. 3), the pistons 45 are cooled. Although the oil pressure in the sub gallery 76 is lowered because the oil has been fed to the piston jets 77, the lubricating route from the main gallery 62 toward the sub gallery 76 is different from the lubricating route from the main gallery 62 toward the bearing 102a of the crankshaft 41 (see FIG. 6A). Accordingly, the lowering of the oil pressure due to the piston jets 77 can be suppressed from affecting the oil pressure on the bearing 102a of the crankshaft 41.

As shown in FIG. 6C, the oil which has been delivered to the sub gallery 76 moves into the further deeper side of the sub gallery 76 (more closely to the downstream side) than the piston jets 77 (see FIG. 6B) to be fed to the bearing 78 (see FIG. 4) of the turboshaft (not shown) of the supercharger from a supercharger inlet 79. In this manner, the oil which has lubricated the bearing 73a of the front balancer shaft 51 can be reused for lubricating the piston jets 77 and the bearing 78 of the turboshaft. In addition, the oil passages 72a and 75a are formed in front walls of the upper case 27 and the lower case 28. Accordingly, extra parts of the crankcase 21 for forming independent oil passages 72a and 75a can be dispensed with so that the weight of the crankcase 21 can be reduced.

Figure 7A:
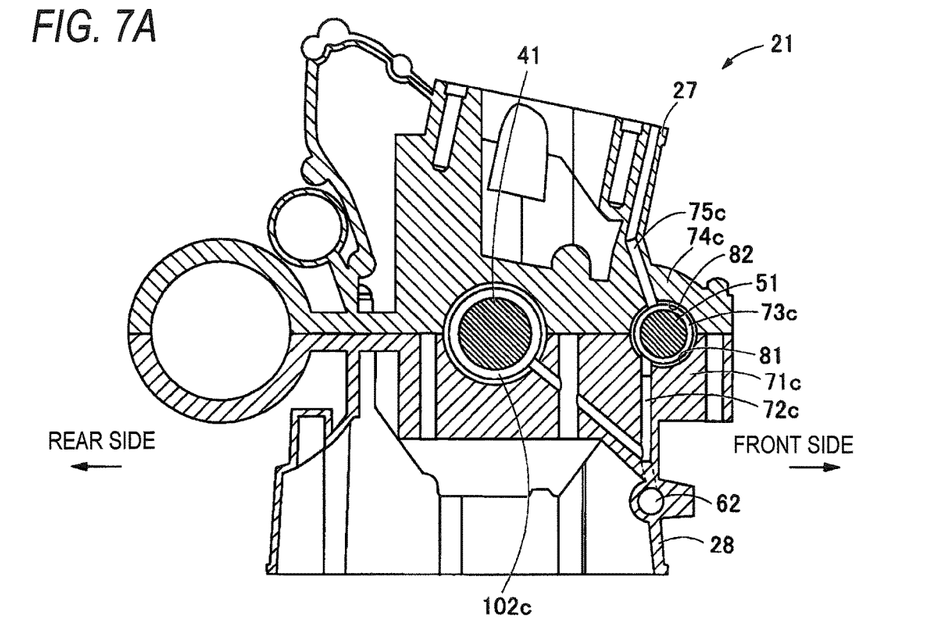
FIGS. 7A and 7B are sectional views of the crankcase according to the embodiment.
Figure 7B:
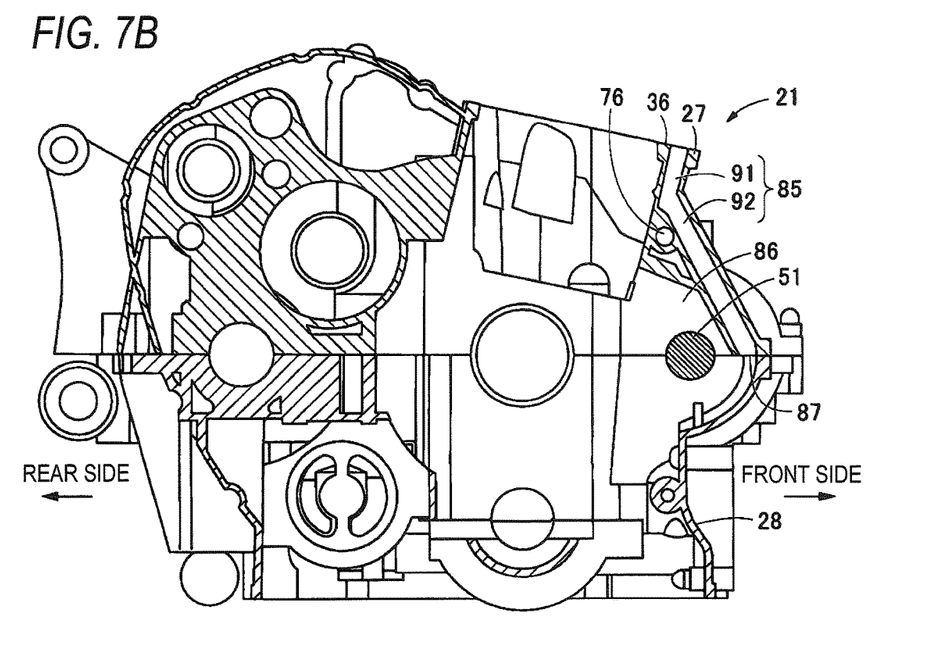
Figure 8:
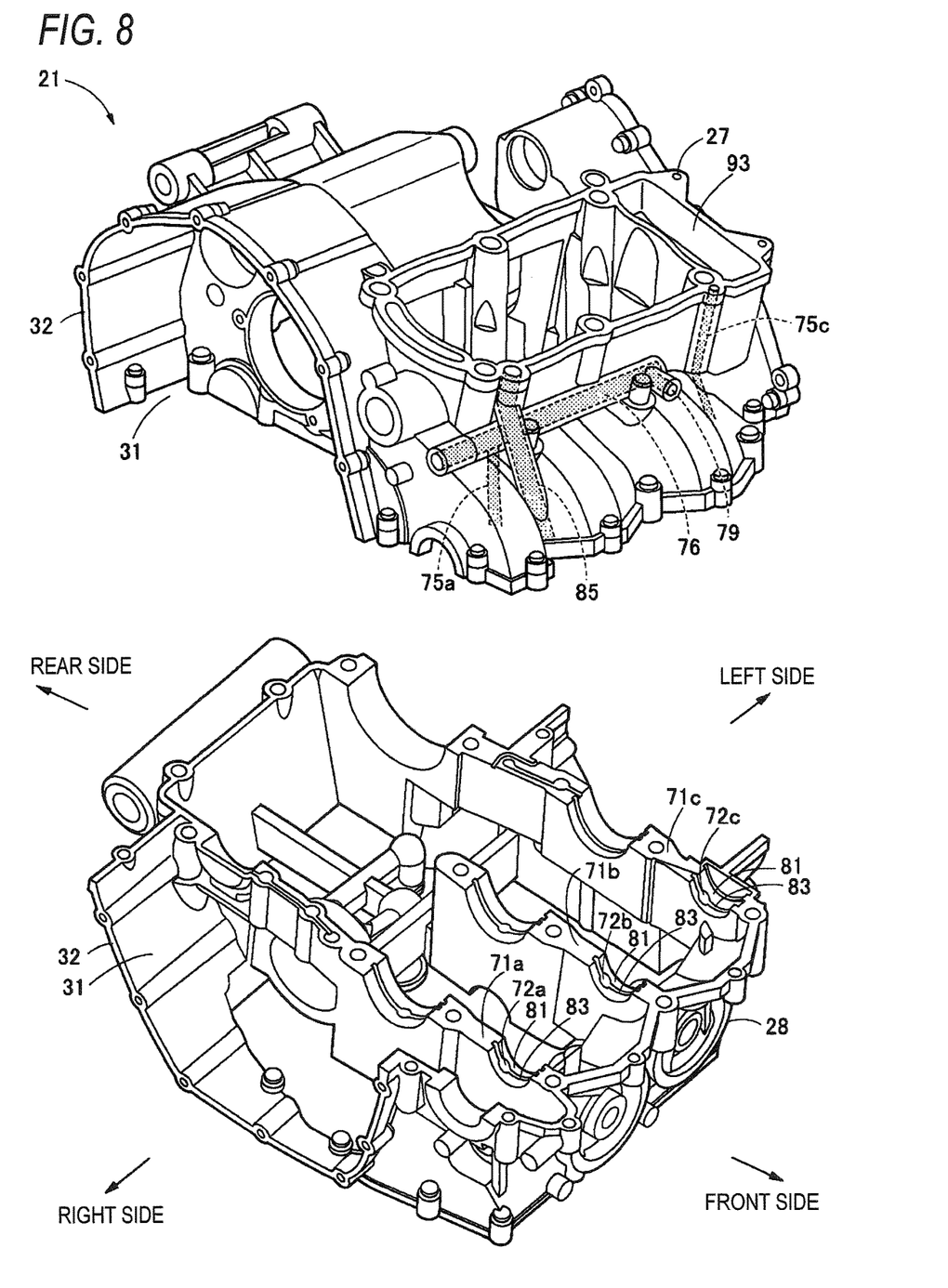
FIG. 8 is a perspective view of an upper case and a lower case according to the embodiment.

Successively, the lubricating route for the cylinder head will be described with reference to FIG. 5, FIGS. 7A and 7B and FIG. 8. FIGS. 7A and 7B are sectional views of the crankcase according to the embodiment. FIG. 8 is a perspective view of the upper case and the lower case according to the embodiment. Incidentally, FIG. 7A is a sectional view of FIG. 5 taken along a line D-D thereof. FIG. 7B is a sectional view of FIG. 5 taken along a line E-E thereof. Incidentally, FIG. 7B will be described with the various shafts omitted for convenience of explanation.

As shown in FIGS. 5 and 7A, the oil passages 72c and 75c are formed on the left side of the crankcase 21 so that the oil of the main gallery 62 can be guided by the oil passages 72c and 75c to pass through the bearing 73c of the front balancer shaft 51. The oil passage 72c extends from the main gallery 62 up to a bearing mounting face 81 for the front balancer shaft 51 on the lower case 28 side. The oil passage 75c extends toward the cylinder head 12 (see FIG. 1) from a bearing mounting face 82 for the front balancer shaft 51 on the upper case 27 side. In addition, oil grooves 83 (see FIG. 8) are formed in the bearing mounting faces 81 and 82 for the front balancer shaft 51. The oil grooves 83 serve as oil passages which connect the oil passages 72c and 75c to each other.

In addition, the front balancer shaft 51 is received in the front balancer chamber 86 (see FIG. 7B). Accordingly, oil can be returned to the oil pan 22 (see FIG. 1) even when the oil leaks. The oil passages pass through the position where the front balancer shaft 51 is mounted, in the same manner as the lubricating route of the sub gallery 76. Accordingly, differently from a case where the oil passages are formed in another position than the position where the bearing 73 is mounted, a sealing material such as an O-ring for preventing leakage of oil can be dispensed with so that the number of components can be reduced. In addition, the oil passages 72c and 75c are formed in the front walls of the lower wall 28 and the upper case 27. Accordingly, extra parts of the crankcase 21 for forming independent oil passages 72c and 75c can be dispensed with so that the weight of the crankcase 21 can be reduced.

Since oil with high oil pressure is delivered from the oil pump 61 (see FIG. 4) to the main gallery 62, the oil with high oil pressure can be fed to the bearing 73c of the front balancer shaft 51 from the main gallery 62. As a result, a sufficiently thick oil film can be formed on the bearing 73c of the front balancer shaft 51 which requires high oil pressure so that the front balancer shaft 51 can be prevented from seizing. On this occasion, sufficient oil pressure still remains in the oil even after the oil is fed to the bearing 73c of the front balancer shaft 51. In order to effectively use the oil pressure of the oil, the oil which has passed through the left bearing 73c of the front balancer shaft 51 is delivered to the cylinder head 12 while keeping the sufficient oil pressure.

The oil which has been delivered to the cylinder head 12 enters the camshaft from a left end of the camshaft to lubricate the cam or the tappet etc. due to the centrifugal force the oil receives. In this manner, the oil which has lubricated the bearing 73c of the front balancer shaft 51 can be reused for lubricating the cylinder head 12. Incidentally, the oil pressure in each of the oil passages 72c and 75 is lowered due to the oil fed to the cylinder head 12. However, the lubricating route from the main gallery 62 toward the cylinder head 12 is different from the lubricating route from the main gallery 62 toward the bearing 102c of the crankshaft 41. Accordingly, the lowering of the oil pressure due to the cylinder head 12 can be suppressed from affecting the oil pressure on the bearing 102c of the crankshaft 41.

In addition, the oil passages 72a and 75a for feeding the oil of the main gallery 62 to the sub gallery 76 are formed on the right side of the crankcase 21 (see FIG. 6A). The oil passages 72c and 75c for feeding the oil of the main gallery 62 to the cylinder head 12 are formed on the left side of the crankcase 21. Accordingly, the oil pressure of the main gallery 62 can be divided into equal halves on the left and right sides. In addition, the oil passages 72a and 75a and the oil passages 72c and 75c are distant from each other on the left and right sides. Therefore, the lowering of the oil pressure due to the piston jets 77 can be prevented from affecting the oil pressure of the cylinder head 12. Similarly, the lowering of the oil pressure in the cylinder head 12 can be prevented from affecting the oil pressure of the sub gallery.

As shown in FIG. 7B, the oil return passage 85 is formed on the right side of the crankcase 21 so that oil can be returned from the cylinder head 12 (see FIG. 1) into the crankcase 21 through the oil return passage 85. That is, oil is returned from the cylinder head 12 on the opposite side of the crankcase 21 in the left/right direction to the oil passages 72*c* and 75*c*. The outlet 87 of the oil return passage 85 is connected to the front balancer chamber 86 in which the front balancer shaft 51 is received inside the crankcase 21. In this case, in the front balancer chamber 86, the outlet 87 of the oil return passage 85 is connected on the front side of the crankcase 21 relatively to the front balancer shaft 51 and on the right side of the crankcase 21.

In this position, return oil from the oil return passage 85 can be made farthest from the front balancer shaft 51. The return oil from the outlet 87 of the oil return passage 85 flows along an inner wall face of the crankcase 21 in the front balancer chamber. Accordingly, the return oil does not make contact with any rotary component such as a balancer weight etc. of the front balancer shaft 51. Accordingly, generation of oil mist inside the front balancer chamber 86 can be reduced so that mixture of the oil mist into blowby gas can be reduced. In addition, since the return oil does not make contact with the rotary component, the return oil can be returned from the cylinder head 12 to the oil pan 22 quickly.

In addition, the oil return passage 85 has a perpendicular passage 91, and an inclined passage 92. The perpendicular pipe 91 extends downward from a mating face 36 between the crankcase 21 and the cylinder 10. The inclined passage 92 extends from a lower end of the perpendicular passage 91 toward the front of the crankcase 21. The inclined passage 92 is inclined so that the inclined passage 92 can become vertical when the crankcase 21 (internal combustion engine 1) is mounted in the vehicle. That is, the inclination of the inclined passage 92 is designed in consideration of the mounting angle of the crankcase 21. Thus, the return oil can be returned to the oil pan 22 quickly. Incidentally, "vertical" mentioned herein is not limited to a completely vertical case, but may include a substantially vertical case approximating to the vertical case.

In addition, the oil return passage 85 is formed in a front wall of the cylinder 10 (see FIG. 1) and the front wall of the upper case 27. Accordingly, an extra part of the crankcase 21 for forming an independent oil return passage 85 can be dispensed with so that the weight of the crankcase 21 can be reduced. In this case, the oil return passage 85 passes through the front side of the crankcase 21 relatively to the sub gallery 76. Since the oil return passage 85 is formed in a dead space of the front wall of the crankcase 21 where the sub gallery 76 is formed, the weight of the crankcase 21 can be further reduced.

In addition, the cam chain chamber 93 (see FIG. 8) where the cam chain (not shown) is received is formed on the left side of the crankcase 21. The cam chain chamber 93 is formed on the opposite side to the oil return passage 85 in the left/right direction of the crankcase 21. Accordingly, a flow amount of oil into the cam chain chamber 93 can be reduced. Consequently, contact between the return oil and the cam chain can be reduced so that generation of oil mist in the cam chain chamber 93 can be reduced. In addition, since oil is returned efficiently to the oil pan 22 from the opposite left and right sides of the cylinder head 12, accumulation of the oil in the cylinder head 12 can be solved.

Further, as described above, the oil passages 72*c* and 75*c* are formed on the left side of the crankcase 21, and the oil return passage 85 is formed on the right side of the crankcase 21 (see FIG. 8). Thus, a lubricating route can be formed so that oil can be fed from the left side of the crankcase 21 to the camshaft and returned from the right side of the crankcase 21 to the crankcase 21 through the lubricating route. In addition, the oil return passage 85 is formed between the oil passages 72*a* and 75*a* and the oil passages 72*c* and 75*c*. Accordingly, the width of the crankcase 21 in the left/right direction can be reduced.

As described above, according to the embodiment, oil with high oil pressure is delivered from the oil pump 61 to the main gallery 62. The oil with high oil pressure is fed from the main gallery 62 to the bearings 73*a* to 73*c* of the front balancer shaft 51 through the oil passages 72*a* to 72*c*. Accordingly, the front balancer shaft 51 can be rotatably supported on the bearings 73*a* to 73*c* by oil films of the oil so that the front balancer shaft 51 can be prevented from seizing. In addition, since the oil pressure of the oil which has been delivered to the cylinder head 12 through the bearing 73*c* of the front balancer shaft 51 is high, the oil can be reused for lubricating the respective portions inside the cylinder head 12. In addition, oil can be fed from the main gallery 62 to the bearing 73*c* of the front balancer shaft 51 and the cylinder head 12 through the oil passages 72*c* and 75*c* shared by the bearing 73*c* of the front balancer shaft 51 and the cylinder head 12. Accordingly, it is unnecessary to form independent oil passages for the bearing 73*c* of the front balancer shaft 51 and the cylinder head 12 in the crankcase 21. Thus, arrangement of the individual pipes can be dispensed with, the weight and the man-hours can be prevented from increasing, and the oil passages can be further shortened.

As described above, according to the embodiment, oil which has entered the oil return passage 85 from the cylinder head 12 flows down from the outlet 87 of the oil return passage 85 to the front side relatively to the front balancer shaft 51 in the balancer chamber 86 inside the crankcase 21. Since the outlet 87 of the oil return passage 85 is distant from the front balancer chamber 51, the oil does not make contact with the front balancer shaft 51. Accordingly, generation of oil mist inside the crankcase 21 can be reduced so that mixture of the oil mist into blowby gas can be reduced. In addition, since oil from the oil return passage 85 does not make contact with the front balancer shaft 51, oil can be returned from the cylinder head 12 into the crankcase 21 quickly.

Incidentally, the invention is not limited to the aforementioned embodiment but may be changed variously and carried out. Sizes, shapes, etc. in the aforementioned embodiment are not limited to those illustrated in the accompanying drawings but can be changed suitably as long as the effects of the invention can be exerted. Moreover, as for any other thing, the invention can be changed suitably and carried out without departing from the scope of the objects of the invention.

For example, in the configuration of the aforementioned embodiment, the oil passages 72*a* and 75*a* for feeding oil of the main gallery 62 to the sub gallery 76 are formed on the right side of the crankcase 21, and the oil passages 72*c* and 75*c* for feeding oil of the main gallery 62 to the cylinder head 12 are formed on the left side of the crankcase 21. However, the invention is not limited to this configuration. The oil passages 72*a* and 75*a* for feeding oil of the main gallery 62 to the sub gallery 76 may be formed on the left side of the crankcase 21, and the oil passages 72c and 75c for feeding oil of the main gallery 62 to the cylinder head 12 are formed on the right side of the crankcase 21. In addition, the invention is not limited to the configuration in which the oil passages 72c and 75c are formed in the end of the crankcase 21. For example, the oil passages 72c and 75c may be formed in an intermediate portion of the crankcase 21 in the left/right direction.

For example, in the configuration of the aforementioned embodiment, in the front balancer chamber 86, the outlet 87 of the oil return passage 85 is connected on the front side of the crankcase 21 relatively to the front balancer shaft 51 and on the right side of the crankcase 21. However, the invention is not limited to this configuration. Any other configuration may be used as long as the outlet 87 of the oil return passage 85 can be connected on the front side of the crankcase 21 relatively to the front balancer shaft 51 in the front balancer chamber 86. For example, the outlet 87 of the oil return passage 85 may be connected on the front side of the crankcase 21 relatively to the front balancer shaft 51 and on the left side of the crankcase 21.

In addition, in the configuration of the aforementioned embodiment, the oil passages 72c and 75c feed the oil which has passed through the bearing 73c of the front balancer shaft 51, to the cylinder head 12. However, the invention is not limited to this configuration. Any other configuration may be used as long as the oil passages 72c and 75c can feed oil to the cylinder head 12. Particularly, the oil passages 72c and 75c may not pass through the bearing 73c of the front balancer shaft 51.

In addition, in the configuration of the aforementioned embodiment, the oil return passage 85 has the inclined passage 92. However, the invention is not limited to this configuration. Any other configuration may be used as long as the oil return passage 85 can be formed to return oil from the cylinder head 12 into the crankcase 21. The return oil passage 85 may not have the inclined passage 92 which faces the vertical direction when the crankcase 21 is mounted.

In addition, in the configuration of the aforementioned embodiment, the cam chain chamber 93 is formed on the left side of the crankcase 21, and the oil return passage 85 is formed on the right side of the crankcase 21. However, the invention is not limited to this configuration. The cam chain chamber 93 may be formed on the right side of the crankcase 21, and the oil return passage 85 may be formed on the left side of the crankcase 21. In addition, the invention is not limited to the configuration in which the oil return passage 85 is formed in the end of the crankcase 21. For example, the oil return passage 85 may be formed in an intermediate portion of the crankcase 21 in the left/right direction.

In addition, in the configuration of the aforementioned embodiment, the oil passages 72c and 75c are formed on the left end side of the crankcase 21, and the oil return passage 85 is formed on the right end side of the crankcase 21. However, the invention is not limited to this configuration. The oil passages 72c and 75c may be formed on the right side of the crankcase 21, and the oil return passage 85 may be formed on the left side of the crankcase 21.

In addition, in the configuration of the aforementioned embodiment, the oil return passage 85 passes through the front side of the crankcase 21 relatively to the sub gallery 76. However, the invention is not limited to this configuration. The oil return passage 85 may pass through the rear side of the sub gallery 76 in the front wall of the crankcase 21.

In addition, in the configuration of the aforementioned embodiment, the oil return passage 85 is formed only in the upper case 27, and oil is returned from the outlet 87 of the oil return passage 85 to the oil pan 22 along the inner wall of the lower case 28. However, the invention is not limited to this configuration. The oil return passage 85 may be formed in both the upper case 27 and the lower case 28. Thus, oil can be guided to the oil pan 22 further smoothly.

In addition, in the configuration of the aforementioned embodiment, the sub gallery 76 is formed in front of the crankshaft 41 in the crankcase 21. However, the invention is not limited to this configuration. The sub gallery 76 may be formed at the rear of the crankshaft 41 in the crankcase 21, or the sub gallery 76 may be not formed in the crankcase 21. Even in such a crankcase 21, oil can be returned from the cylinder head 12 quickly.

In addition, in the aforementioned embodiment, the oil return passage 85 may be formed by use of a machining tool such as a drill or may be formed by a core during the casting.

In addition, in the configuration of the aforementioned embodiment, the front balancer shaft 51 and the lower balancer shaft 54 are disposed in the crankcase 21. However, the invention is not limited to this configuration. Any other configuration may be used as long as at least one balancer shaft can be disposed in the crankcase 21. For example, the balancer shaft may be disposed on the rear side of the crankshaft 41.

In addition, in the configuration of the aforementioned embodiment, the front balancer shaft 51 is disposed in the mating face 34 between the upper case 27 and the lower case 28. However, the invention is not limited to this configuration. The front balancer shaft 51 may be disposed in one of the upper case 27 and the lower case 28.

In addition, in the configuration of the aforementioned embodiment, the crankcase 21 has the vertically divided structure including the upper case 27 and the lower case 28. However, the invention is not limited to this configuration. The crankcase 21 may have a horizontally divided structure including the upper case 27 and the lower case 28 in the configuration.

In addition, in the configuration of the aforementioned embodiment, the sub gallery 76 is formed in parallel with the main gallery 62. However, the invention is not limited to this configuration. The main gallery 62 and the sub gallery 76 may be formed not in parallel with each other. In addition, the main gallery 62 and the sub gallery 76 are formed linearly in the aforementioned embodiment. However, the invention is not limited to this configuration. The main gallery 62 and the sub gallery 76 may be changed suitably in accordance with the shape of the crankcase 21.

In addition, in the configuration of the aforementioned embodiment, the oil grooves 83 are formed in the bearing mounting faces 81 and 82 of the journal walls 71 and 74 so that oil can be guided by the oil grooves 83 to pass through the bearing 73c of the front balancer shaft 51. However, the invention is not limited to this configuration. Any other configuration may be used as long as oil can pass through the bearing 73c of the front balancer shaft 51. For example, an oil groove may be formed in the bearing 73c or an oil groove may be formed in the front balancer shaft 51.

In addition, in the configuration of the aforementioned embodiment, the oil return passage 85 is formed on the right side of the crankcase 21. However, the invention is not limited to this configuration. Any other configuration may be used as long as the oil return passage 85 can be formed between the oil passages 72a and 75a and the oil passages 72c and 75c so as to prevent the width of the crankcase 21 in the left/right direction from increasing.

As described above, the first aspect of the invention has an effect that the oil passages can be shortened without increasing the weight and the man-hours of machining, and further, oil with high oil pressure from the main gallery can be effectively used. The first aspect of the invention is particularly useful for a lubricating structure of an internal combustion engine of a motorcycle.

As described above, the second aspect of the invention has an effect that oil can be returned from the cylinder head into the crankcase quickly without increasing oil mist. The second aspect of the invention is particularly useful for a lubricating structure of an internal combustion engine of a motorcycle.

What is claimed is:

1. A lubricating structure of an internal combustion engine for feeding oil from an oil pump to respective portions of the internal combustion engine where a balancer shaft is disposed in parallel with a crankshaft in a crankcase, wherein: a main gallery and an oil passage are provided in the crankcase so that oil can be delivered from the oil pump to the main gallery and the oil of the main gallery can be guided by the oil passage to pass through a bearing of the balancer shaft; the oil passage feeds the oil that has passed through the bearing of the balancer shaft to a cylinder head; a sub gallery for feeding the oil of the main gallery to respective portions of the internal combustion engine is provided in the crankcase; and the oil passage is provided at one of opposite left and right sides of the crankcase while another oil passage for feeding the oil of the main gallery to the sub gallery is provided at the other of said opposite left and right sides of the crankcase.

2. The lubricating structure of an internal combustion engine according to claim 1, wherein the oil passage is provided in the crankcase so as to pass through an axial end of the balancer shaft.

3. The lubricating structure of an internal combustion engine according to claim 1, wherein: the crankcase comprises an upper case and a lower case which are divided from each other vertically; and the bearing of the balancer shaft is disposed in a mating face between the upper case and the lower case.

4. The lubricating structure of an internal combustion engine according to claim 1, wherein a lubricating route from the main gallery toward the cylinder head and a lubricating route from the main gallery toward a bearing of the crankshaft are different from each other.

5. The lubricating structure of an internal combustion engine according to claim 1, wherein an oil return passage for returning the oil from the cylinder head to a lower portion of the internal combustion engine is provided between the oil passage and the other oil passage in a left and right direction of the crankcase.

6. The lubricating structure of an internal combustion engine according to claim 1, wherein:
the balancer shaft serves as a front balancer shaft disposed in front of the crankshaft;
a lower balancer shaft is disposed below the crankshaft; and
the main gallery is provided in front of the lower balancer shaft in the crankcase.

7. A motorcycle comprising: the lubricating structure of the internal combustion engine according to claim 1.

8. A lubricating structure of an internal combustion engine for feeding oil to a cylinder head from a crankcase in which a balancer shaft is disposed in parallel with a crankshaft, wherein: an oil passage for feeding oil to the cylinder head and an oil return passage for returning the oil from the cylinder head into the crankcase are provided in the crankcase; an outlet of the oil return passage is connected to a balancer chamber on a front side of the crankcase relative to the balancer shaft which is received in the balancer chamber inside the crankcase; a main gallery and a sub gallery are provided in the crankcase so that oil can be fed from the main gallery to a bearing of the balancer shaft and the oil that has passed through the bearing of the balancer shaft can be fed to respective portions of the internal combustion engine through the sub gallery located above the balancer chamber; and the oil return passage passes through the front side of the crankcase relative to the sub gallery.

9. The lubricating structure of an internal combustion engine according to claim 8, wherein the outlet of the oil return passage is connected to a front side of the balancer chamber on one end side of the crankcase in a left and right direction.

10. The lubricating structure of an internal combustion engine according to claim 8, wherein the oil return passage has an inclined passage that is inclined toward the front of the crankcase so that the inclined passage becomes vertical when the crankcase is mounted in a vehicle.

11. The lubricating structure of an internal combustion engine according to claim 8, wherein a cam chain chamber where a cam chain is received inside the crankcase is provided at one of opposite left and right sides of the crankcase, and the oil return passage is provided at the other of said opposite left and right sides of the crankcase.

12. The lubricating structure of an internal combustion engine according to claim 8, wherein the oil passage is provided at one of opposite left and right sides of the crankcase and the oil return passage is provided at the other of said opposite left and right sides of the crankcase.

13. The lubricating structure of an internal combustion engine according to claim 8, wherein the oil passage feeds the oil that has passed through a bearing of the balancer shaft to the cylinder head.

14. The lubricating structure of an internal combustion engine according to claim 8, wherein:
the balancer shaft serves as a front balancer shaft disposed in front of the crankshaft;
a lower balancer shaft is disposed below the crankshaft; and
the main gallery is provided in front of the lower balancer shaft in the crankcase.

15. A motorcycle comprising: the lubricating structure of the internal combustion engine according to claim 8.

* * * * *